United States Patent
Eves et al.

(10) Patent No.: US 10,897,803 B2
(45) Date of Patent: Jan. 19, 2021

(54) METHOD AND DEVICE FOR CONTROLLING OUTPUT DEVICES BASED ON GENERATING A GRID FROM SENSOR DEVICE INPUTS AND LOCATION INFORMATION

(71) Applicant: AMBX UK LIMITED, Redhill (GB)

(72) Inventors: David Eves, Crawley (GB); Richard Cole, Redhill (GB)

(73) Assignee: AMBX UK LIMITED, Redhill (GB)

( * ) Notice: Subject to any disclaimer, the term of this patent is extended or adjusted under 35 U.S.C. 154(b) by 0 days.

(21) Appl. No.: 16/331,665

(22) PCT Filed: Sep. 8, 2017

(86) PCT No.: PCT/EP2017/072603
§ 371 (c)(1),
(2) Date: Mar. 8, 2019

(87) PCT Pub. No.: WO2018/046672
PCT Pub. Date: Mar. 15, 2018

(65) Prior Publication Data
US 2019/0200437 A1   Jun. 27, 2019

(30) Foreign Application Priority Data
Sep. 9, 2016 (GB) .................................. 1615353.8

(51) Int. Cl.
*H05B 47/105* (2020.01)
*G05B 15/02* (2006.01)

(52) U.S. Cl.
CPC ........... *H05B 47/105* (2020.01); *G05B 15/02* (2013.01); *G05B 2219/2614* (2013.01)

(58) Field of Classification Search
CPC ............ H05B 37/0227; H05B 37/0272; H05B 37/0263; H05B 47/105; G05B 15/02
See application file for complete search history.

(56) References Cited

U.S. PATENT DOCUMENTS 8,729,835 B2 * 5/2014 Henig ................ H05B 37/0254
315/294
2013/0229115 A1 * 9/2013 Pandharipande .... H05B 39/042
315/152

(Continued)

FOREIGN PATENT DOCUMENTS

WO   20150054611 A1   4/2015

OTHER PUBLICATIONS

Kopelowitz and Porat, Improved Algorithms for Polynomial-Time Decay and Time-Decay with Additive Error, Department of Computer Science.

*Primary Examiner* — Borna Alaeddini
(74) *Attorney, Agent, or Firm* — Burns & Levinson LLP; Bruce D. Jobse

(57) ABSTRACT

A method of controlling output devices (10) comprises receiving inputs (12) from sensor devices (14), accessing location information (16) defining the location of each sensor device (14), generating a grid (18) from the received inputs (12) and the accessed location information (16), the grid (18) containing non-zero values (20) at the locations of the sensor devices (14) for which an input (12) has been received and containing non-zero values (20) at locations related to the locations of the sensor devices (14) for which an input (12) has been received, accessing location information (22) defining the location of each output device (10), and transmitting outputs (24) to those output devices (10) whose value at the location of the respective output device (10) within the grid (18) is above a predetermined threshold.

8 Claims, 6 Drawing Sheets

(56) References Cited

U.S. PATENT DOCUMENTS

| | | | |
|---|---|---|---|
| 2014/0354161 A1* | 12/2014 | Aggarwal | H05B 37/0245 |
| | | | 315/153 |
| 2015/0088313 A1 | 3/2015 | Hamada | |
| 2015/0102734 A1* | 4/2015 | Asami | H05B 37/0272 |
| | | | 315/154 |
| 2017/0127496 A1* | 5/2017 | Pandharipande | H05B 47/105 |
| 2018/0321645 A1* | 11/2018 | Caicedo Fernandez | |
| | | | G05B 19/02 |
| 2019/0045180 A1* | 2/2019 | Caicedo Fernandez | |
| | | | G06T 7/246 |

\* cited by examiner

METHOD AND DEVICE FOR CONTROLLING OUTPUT DEVICES BASED ON GENERATING A GRID FROM SENSOR DEVICE INPUTS AND LOCATION INFORMATION

CROSS-REFERENCE TO RELATED APPLICATIONS

This application is a U.S. national stage application under 35 U.S.C. 371 of co-pending International Application No. PCT/EP2017/072603, filed on Sep. 8, 2017, and entitled CONTROL OF OUTPUT DEVICES, which in turn claims priority to and benefit of Great Britain Patent Application No. 1615353.8, filed on Sep. 9, 2016, which are incorporated by reference herein in their entirety for all purposes.

This invention relates to a method, system and computer program product for controlling output devices.

It is known to control an output device, such as a light, using an input from a sensor device. For example, in many modern office buildings an output device such as a light in a bathroom will be controlled by a sensor device such as a movement sensor that detects the presence of a person in that bathroom. As a person enters the bathroom, their presence is detected by the sensor device and this triggers the turning on of the light. The light is then turned off once no further input is received from the sensor device after a predetermined length of time. This arrangement of sensor device and output device has the advantage that electricity is saved, since the light will only be turned on when it is actually needed.

In conventional systems, managing the control of lighting, dependent on large arrays of sensors quickly becomes a complex programming and processing problem. Conventional systems rely on a combination of IF THEN rules to govern how individual, or groups, of lights react to different sensor values or threshold changes. Often in complex systems sensor data is pre-analysed or processed to reduce the volume of content. However this typically still ends up providing just a reduced set of similar aggregated values used to manage control commands to the lighting components.

Managing output devices such as lights becomes more complicated when there are a larger number of sensors and a corresponding larger number of lights. For example, consider a large museum that uses movement sensors and lights connected to the movement sensors throughout the museum. A simple arrangement of lights would be to connect each sensor to a single light; however this assumes that a one-to-one correspondence exists between the sensors and lights and such an arrangement is highly unlikely to properly capture the movement of different people throughout the spaces being lit. More complex system management is possible, but this is usually based around a central processor that runs a large number of IF THEN statements that control which lights are turned on in response to which sensor inputs. Using a central processor that uses an IF THEN based logic has a number of significant weaknesses. Firstly, the logical statements that define which lights are turned in response to which sensor inputs have to be authored by someone who understands the capabilities of the lights and sensors and also has to understand the requirements of the space being lit, which may be large and complex. The authoring of the logical statements is time consuming and prone to error. The use of logical statements also results in an end system that is not particularly flexible, in that it is not easily scalable or transferrable. For example, if new lights or sensors are added to the space being lit, then new logical statements have to be authored and/or the original logical statements have to be amended, which again is highly likely to be time consuming and prone to error. It is also highly likely that the logical statements that have been authored are not transferrable to a different lighting installation, meaning that new statements have to be authored at each new installation.

It is therefore an object of the invention to improve upon the known art.

According to a first aspect of the present invention, there is provided a method of controlling output devices, the method comprising the steps of receiving inputs from sensor devices, accessing location information defining the location of each sensor device, generating a grid from the received inputs and the accessed location information, the grid containing non-zero values at the locations of the sensor devices for which an input has been received and containing non-zero values at locations related to the locations of the sensor devices for which an input has been received, accessing location information defining the location of each output device, and transmitting outputs to those output devices whose value at the location of the respective output device within the grid is above a predetermined threshold.

According to a second aspect of the present invention, there is provided a system for controlling output devices, the system comprising a processor arranged to receive inputs from sensor devices, access location information defining the location of each sensor device, generate a grid from the received inputs and the accessed location information, the grid containing non-zero values at the locations of the sensor devices for which an input has been received and containing non-zero values at locations related to the locations of the sensor devices for which an input has been received, access location information defining the location of each output device, and transmit outputs to those output devices whose value at the location of the respective output device within the grid is above a predetermined threshold.

According to a third aspect of the present invention, there is provided a computer program product on a computer readable medium for controlling output devices, the computer program product comprising instructions for receiving inputs from sensor devices, accessing location information defining the location of each sensor device, generating a grid from the received inputs and the accessed location information, the grid containing non-zero values at the locations of the sensor devices for which an input has been received and containing non-zero values at locations related to the locations of the sensor devices for which an input has been received, accessing location information defining the location of each output device, and transmitting outputs to those output devices whose value at the location of the respective output device within the grid is above a predetermined threshold.

Owing to the invention, it is possible to provide a system that can control output devices such as lights from sensor devices such as movement sensors using an intermediate representation that is both scalable and transferrable that does not require the authoring of logical statements. The inputs from the sensor devices are mapped to a grid that uses the locations of the sensors to plot values within the grid, with a sensor output generating a value in the grid at the location of the sensor and also in the area surrounding the sensor device. The grid is then used to drive the output devices. The use of the intermediate representation of the grid separates the sensor devices from the output devices and allows new sensors and new output devices to be easily added to the system, without any great change, other than correctly locating the new devices within the grid. Different types of sensor devices and output devices can all be utilised within the same grid, without the need for any alteration of the intermediate representation or the processing of the system.

Preferably, the step of generating the grid comprises executing an algorithm that generates first values at the locations of the sensor devices for which an input has been received and generates second values lower than the first values at locations surrounding the locations of the sensor devices for which an input has been received. The system can use a specific algorithm that defines how the inputs from the sensor devices are translated into the non-zero values in the grid that defines the universal picture of the sensor inputs. This algorithm will generate a higher value in the grid at the actual location of a specific sensor device for which an input is received and lower values in the grid at locations around the actual location of the specific sensor device. The definition of the location around the specific location of a sensor device can be made in a simple manner, such as using a defined radius around the location of the sensor in question or using a square with the position of the sensor in question at the centre of the square.

Advantageously, the method further comprises applying a time decay function to the values of the grid, the time decay function lowering the non-zero values of the grid by a defined amount per predefined time period. A time decay function can be used to lower the values within the grid over time. This ensures that the data represented by the grid gives greatest weight to the most recent events that generate the values within the grid, without losing all of the information immediately a sensing device is no longer providing an input to the grid. For example, an input from a movement sensor will cause a value to be placed in the grid at the location of that sensor and in locations around the sensor. As long as input is continued to be received from the sensor device in question then the grid values will be stable. However, once the sensor device is no longer sensing any movement then the system will not receive any further input from that specific sensor device. At this point the time decay function will take over to degrade the relevant values in the grid over time. The rate of decay can be set in terms of both the reduction and the time period used. For example, each value could be reduced by 10% every 20 seconds, with any value below a certain level being set to zero.

Ideally, the method further comprises identifying each sensor device as a specific type of sensor device and accessing a plurality of different functions for respective sensor device types and wherein the generating of a grid includes processing each input received from a sensor device with the respective function for the specific type of sensor device. The sensor devices can be categorised as different types of sensors. For example sensor types could be movement sensors, heat sensors, light sensors etc. The input from sensor devices that will go into the generation of the grid can be processed using algorithms that are specific for the individual sensor type. For example, an input from a movement sensor may be translated as a small radius located on the specific sensor device, whereas a light sensor may be translated as a more widespread effect within the grid. A function could set a threshold for an input, so for example a heat sensor may have a threshold applied to the output from that sensor before this leads to an effect in the grid.

The grid receives inputs from sensor devices and provides one or more outputs to output devices. In a simple system, a single type of input device will be used, such as a movement detector and a single type of output device will be used, such as a lighting device. However, as discussed above, different types of input device can be used in the same system and the grid will still be constructed from the different inputs. Similarly on the output side different types of output devices can be used, additionally or as an alternative to lights. So, for example, one or more of the output devices could be a heating device such as a radiator, which is controlled by the grid.

Embodiments of the present invention will now be described, by way of example only, with reference to the accompanying drawings, in which:—

Figure 1:
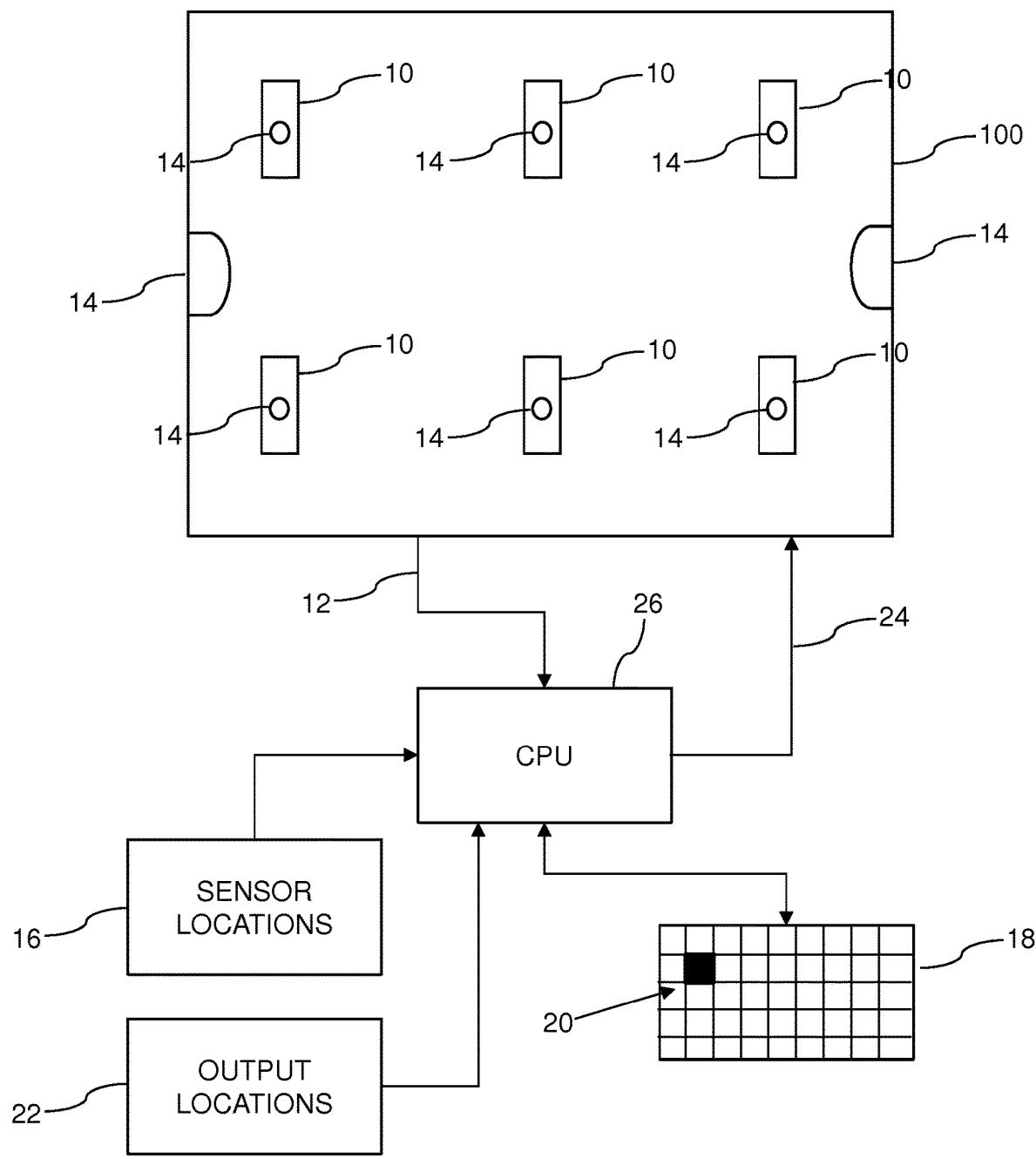
FIG. 1 is a schematic diagram of system for controlling output devices.

FIG. 1 shows a set of output devices 10 that occupy a space 100, such as a large reading room in a library, for example. The output devices 10 are all lights in this example. Also present in the space 100 are a number of sensor devices 14, which here are all movement detectors that detect the movement of people within the space 100. Some of the sensor devices 14 are located integrally with the output devices 10, while other sensor devices 14 are stand-alone devices. All of the output devices 10 and the sensor devices 14 are connected to a central processor 26, which is operated to control the output devices 10 in dependence on the output of the sensor devices 14

The processor 26 receives inputs 12 from the sensor devices 14. In the embodiment shown in FIG. 1, the output of a sensor device 14 is a binary 0 or 1, where a 1 indicates the detection of a person by the respective sensor device 14. The processor 26 also has access to location information 16 that defines the location of each sensor device 14. The processor 26 also has access to location information 22 defining the location of each output device 10. The location information 16 and 22 about the various devices can be expressed in various different ways, but can be simply a Cartesian co-ordinate defining a two-dimensional location of the respective device 10 and 14.

The processor 26 generates a grid 18 from the received inputs 12 and the accessed location information 16, the grid 18 containing non-zero values 20 at the locations of the sensor devices 14 for which an input 12 has been received and containing non-zero values 20 at locations related to the locations of the sensor devices 14 for which an input 12 has been received (such as adjacent locations in the grid 18). The processor transmits outputs 24 to those output devices 10 whose value at the location of the respective output device within the grid 18 is above a predetermined threshold (above zero for example, or above 20% of the largest value in the grid 18 as another example). The processor 26 generates the grid 18 as a way of generating an intermediate representation or platform between the sensor devices 14 and the output devices 10.

The location information 16 and 22 about the locations of the sensors 14 and output devices 10 can be dynamic, so that the location information is polled or an event can be signalled when a location has changed. The use of the grid 18 will cope without modification as the old data for the original position of a sensor 14 or output device 10 will decay and new data will appear at the new location. In this case, the CPU 26 receives new location information for a sensor device 14 or an output device 10 and updates the location information 16 defining the location of each sensor device 14 or the location information 22 defining the location of each output device 10 respectively.

In the example of FIG. 1, all of the output devices 10 are lights. Any output device 10 that provides an output that can be sensed by a person is capable of being part of the system and controlled by the grid 18. For example, heating and cooling devices can be considered output devices 10 so the temperature within a location can be controlled by the grid 18, with the movement sensors 14 being used to detect the location of people within the space 100 and the output of heaters and air conditioning devices being controlled through the grid 18. Audio devices such as speakers can also be considered to be output devices 10 and background music and building announcements can be controlled via the grid 18.

Figure 2:
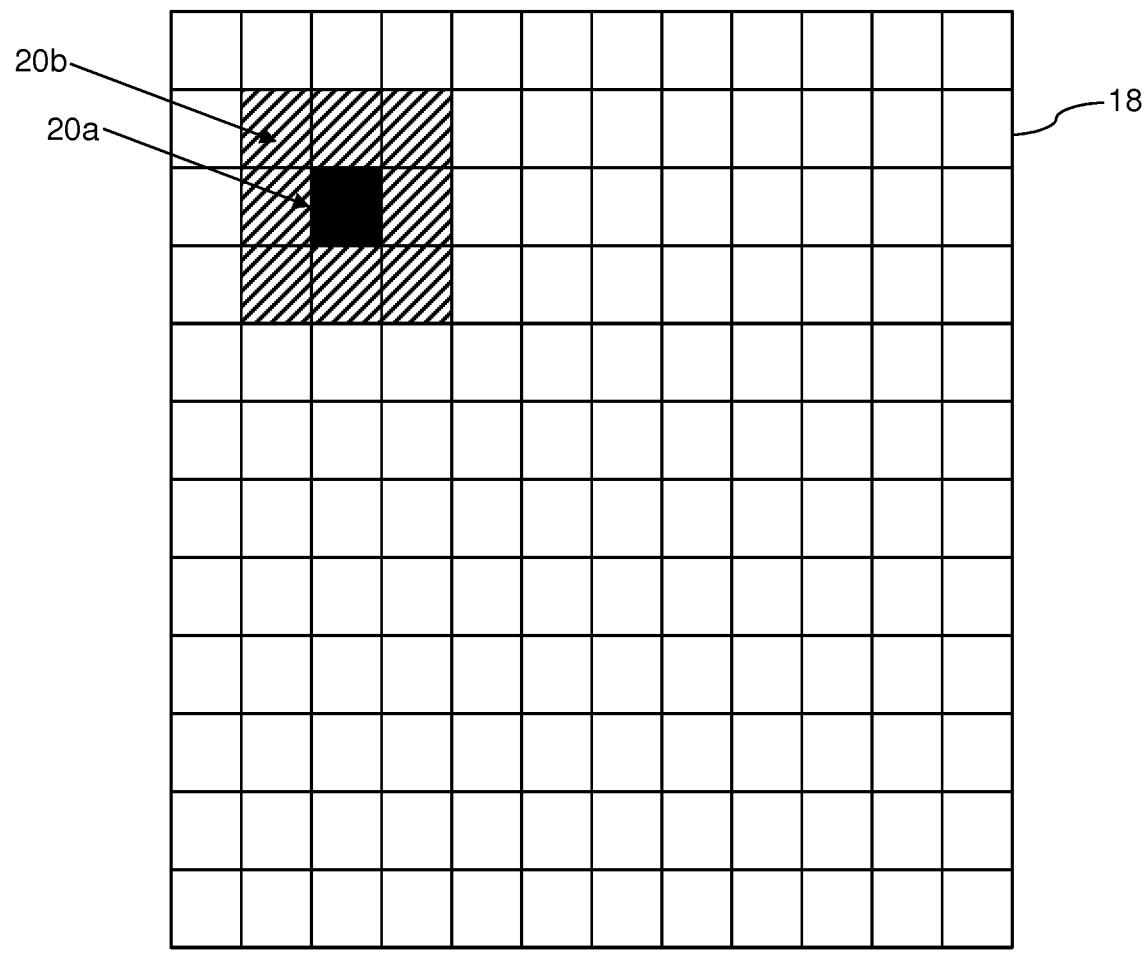
FIG. 2 is a schematic diagram of a grid.

FIG. 2 shows an example of the grid 18 in more detail. The grid 18 is a two-dimensional representation of the space 100, effectively defining an overhead view of the space 100. A more complex grid 18 is possible, for example being represented in three dimensions, with the grid 18 effectively defining a matrix that corresponds to the three dimensional space being represented in the grid 18. In a three dimensional grid 18, the positions of sensor devices 14 and output devices 10 can be located in all three dimensions, using x, y, z co-ordinates for each of the different devices. However, since the principal output devices 10 in this example, are lighting devices, a two dimensional representation is sufficient.

The processor 26 receives outputs 12 from the various sensor devices 14 and these are used to create the entries 20 within the grid 18. In the Figure various horizontal and vertical lines are shown to illustrate the concept of the grid 18, but the grid 18 is simply a two dimensional matrix that is stored in memory and has a level of granularity that can be set at the installation of the system. The number of positions within the grid 18 can be very large or very small depending upon what is appropriate for the space being covered by the grid 18. For example, the grid 18 could be a 3×3 matrix with only 9 different locations or could be a 1000×1000 matrix with $10^6$ different locations.

The grid 18 can be viewable by a user or administrator of the system that delivers the platform between the sensor devices 14 and the output devices 10. A graphical user interface connected to the processor 26 can show the current status of the grid 18 either using numbers to show the actual values currently present within the grid 18 or using colours to grade the level of inputs within the grid 18. The grid 18 can be viewed as a "heat map" with red representing the highest level of input and grading through orange to yellow to represent lower levels of inputs in the grid 18. Since an input to the grid 18 generates values around or adjacent to the specific location of a sensor device 14, colour gradients can be used to illustrate this feature of the grid 18.

In FIG. 2, the value 20a within the grid 18 is shown as black, representing an input from a specific sensor device 14 and the values 20b are shown in shading, representing those secondary locations within the grid 18 that also have values present, as a result of their proximity to the actual location of a sensor 14 that provides an input to the grid 18. In a colour representation of the inputs in these locations, then the value 20a may be represented as red, with the values 20b that surround the value 20a shown as orange. The use of colour provides an easy to understand visual representation of the values in the grid 18.

Figure 3:
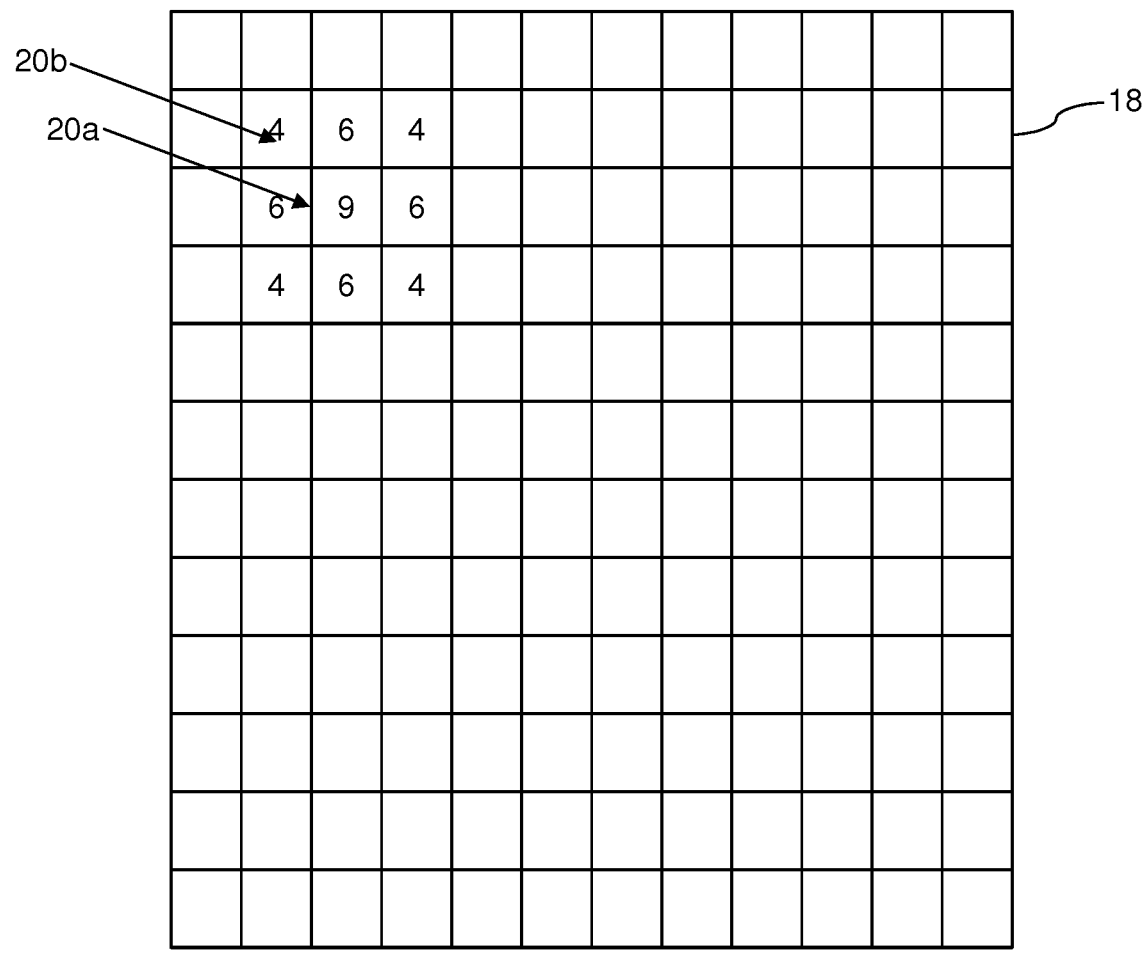
FIG. 3 is a further schematic diagram of the grid.

FIG. 3 shows a further view of the grid 18. The locations of the sensor devices 14 and output devices 10 have to be inputted to the processor 26 when the system is initially set up and the information relating to the locations is stored and is continually available to the processor 26. In this Figure an input has been received from a sensor device 14 and this has led to creation of a value 20a (the number 9) at the location of the sensor device 14 in question. Here the actual values 20 are shown in the grid 18 to illustrate the operation of grid 18.

The processor 26 is operated so that the generating of the grid 18 comprises executing an algorithm that generates first values 20a at the location of the sensor device 14 for which an input 12 has been received and generates second values 20b lower than the first values 20a at locations surrounding the location of the sensor device 14 for which an input 12 has been received. In this way, the "heat map" analogy of the grid 18 is maintained, with an input from a sensor device 14 generating values 20b in the grid 18 that are lower in the area surrounding the actual location of the sensor device 14 within the grid.

The actual values 20 that are created within the grid 18 in response to a received input from a sensor device 14 are generated by one or more algorithms run by the processor 26. The grid 18 is populated with values 20 as inputs are received from the sensor devices 14 and the values 20 are combined at the specific locations within the grid 18. If sensor devices 14 are located sufficiently close together in the grid 18, then the impact of the inputs received from the sensor devices 14 can be to create overlapping areas, in which case values are added together to give higher values in the overlapping regions within the grid 18. More complex combination method can be used other than simple addition.

As long as an input is being received from a sensor device 14 then the algorithm(s) being operated by the processor 26 will create values 20 within the grid 18. Once an input is no longer being received from a sensor device 14, then a time decay function is applied by the processor 26 to the values 20 within the grid 18, effectively applying a "cooling" to the "heat map" values represented within the grid 18. The processor 26 applies a time decay function to the values 20 of the grid 18, for example, the time decay function lowering the non-zero values 20 of the grid 18 by a defined amount per predefined time period.

The processor 26 treats the sensors 14 as inputs to a heat map style intermediate representation 18, which is essentially creating a visualisation of the data on a two or more dimensional grid 18. The grid or heat map 18 will update in real-time as sensor input values change, possibly also interpolating intermediate values when these are not received continually. The grid 18 will tend to be logically matched to the layout of the building to be controlled though the grid 18 can be an abstract representation. One or more of these grids or heat maps 18 can be generated at any time from the arrays of sensors 14. The grid 18 can also be generated or processed in different ways to manage the data, for example by applying a threshold to a value, applying masks or inverting values.

If there are multiple heat maps 18 from different sources these will be combined, preferably using different algorithms. For example, one array of sensors 14 could be used to mask another, be additive, or they could be averaged or amplify each other's effect. Once the heat maps 18 have been processed into a single idealised representation of a grid 18, a video processing algorithm can be carried out on the result. This will perform a video-to-light step from the grid 18 (the heat map image) to rendering on the light fixtures 10, regions on the grid 18 being mapped onto particular groups or individual fixtures.

If multiple grids 18 are used, then the individual heat maps 18 can be maintained in real-time, and they can in themselves be processed, so for example a polled sensor 14 may update the value on the map 18 periodically but values be interpolated between. This could involve a decay of the value or maintain the value based on historical patterns. Complex interactions between different grids 18 can be constructed that result in a final grid 18 being generated that represents the information received from all of the different types of sensors 14 being used in a single final format. All of the different grids 18 and the interactions are managed by the processor 26.

The sensors 14 in a space are mapped to the grid 18. Each sensor input creates an effect on the grid 18. Many sensors 14 combine to form an overall heat map 18 for an array of sensors 14. These will typically be of the same type but do not have to be. At each point in time a snapshot of the heat map or grid 18 is captured. This may be further processed for example to threshold values, interpolate or invert them. Multiple heat maps or grids 18 may be made by different arrays of sensors 14 and in some cases sensors 14 may contribute to multiple maps, not necessarily using the same algorithms. A CO2 sensor might for example both create a presence hotspot, by detecting breathing, and indicate a need for warning lighting due to poor air quality levels.

Heat maps or grids 18 can then be combined into one master map using a variety of algorithms. For example daylight sensing might create a map then used to adjust the overall levels of lighting by its inverse, while a presence heat map might act as a mask for the lighting as a whole. Once one master map or grid 18 is created this is used to indicate the lighting levels required at different points on the grid 18.

As mentioned above, a region based video-to-light algorithm can be used to transform the values of the grid 18 onto a set of output devices 10. This set of devices 10 may well be defined to correspond to the grid 18, though this could be an abstract mapping. Different video-to-light algorithms can also be used at this point to arrive at the most effective outcome. This could for example be an average over a range of grid squares or the highest value found in the region. The region maps can also be changed to direct lighting differently around a space or get sensor input from a wider area. For example, the sensor map could relate to external sensors that then change lighting outcomes inside a building.

Figure 4:
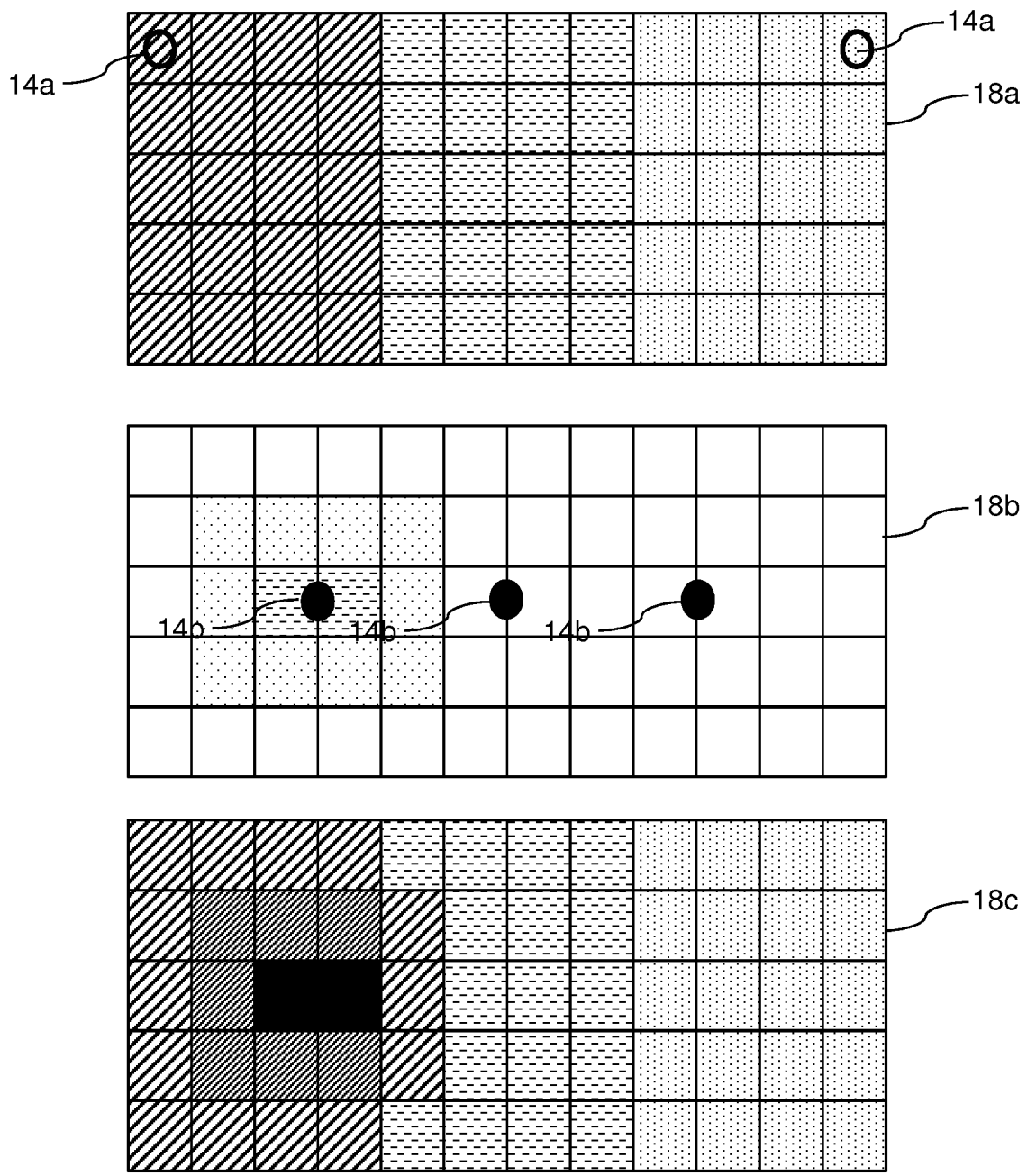
FIG. 4 is a schematic diagram of three different grids.

FIG. 4 shows an example where intermediate heat maps or grid 18a and 18b are used to generate a final heat map or grid 18c. In the heat map 18a two light level detectors 14a are shown and in the heat map 18b three movement detectors 14b are shown. Both heat maps 18a and 18b represent the same space 100 and show the location of the respective sensors 14a and 14b for illustration purposes, as their locations are not stored within the grid 18, only the result of an algorithm that processes the inputs 12 received from the different sensors 14 are actually present within the grid 18 stored by the processor 26.

The processor 26 runs two respective algorithms to process the inputs 12 received from the different sensors 14. In the case of the two light level detectors 14a, the outputs from these sensors 14a, which are inputs 12 to the processor 26, are processed with a first algorithm that uses the different input values from the two sensors 14 to create a gradient across the whole of the grid 18. Here, the relevant algorithm is assuming that the light levels at opposite ends of space 100 are such that values in-between can be interpolated across the whole of the space 100. This leads to the gradient indicated on the grid 18a using different shading styles.

The inputs 12 received from the movement sensors 14b are processed by a second algorithm, which here takes each input 12 received and generates a reading within the grid 18b that is effectively a radius around an input received, with the values in the grid 18b reducing as they are further from the specific received input 12. Here a single movement sensor 14b has detected movement and this results in the second algorithm producing the result shown on the grid 18b, again using different shading styles to illustrate the operation of the algorithm on the received input 12 to produce the grid 18b. The processor 26 is responsible for maintaining the intermediate grids 18a and 18b.

The final grid 18c is constructed from the two intermediate grids 18a and 18b. Here the processor 26 is simply adding the two grids 18a and 18b together to generate the final version 18c. Shading styles are again used to illustrate the specific readings within the grid 18c. In practice colour would be used to more clearly show the "heat map" nature of the grid 18c, as the processor 26 can provide the grid 18c for viewing on a suitable display device to a system administrator. The grid 18c is a representation that lies between the sensors 14 and the output devices 10 and separates the two parts of the overall system.

The processor 26 can be operated to identify each sensor device 14 as a specific type of sensor device 14 and access a plurality of different functions for respective sensor device types. When generating the grid 18, the processor 26 processes each input 12 received from a sensor device 14 with the respective function for the specific type of sensor device 14. The sensor devices 14 are therefore categorised as different types of sensors. For example sensor types could be movement sensors, heat sensors, light sensors and so on.

The input 12 from the different sensor devices 14 that will go into the generation of the grid 18 are processed using algorithms that are specific for the individual sensor type. For example, an input from a movement sensor 14 may be translated as a small radius located around the specific sensor device 14, whereas a light sensor 14 may be translated as a more widespread effect within the grid 18. A function could set a threshold for an input, so for example a heat sensor 14 may have a threshold applied to the output from that sensor 14 before this leads to an effect in the grid 18.

Each function used is defined by what input is required to trigger the function and what sort of values will be entered into grid 18 as a result of the function being triggered. So an input 12 from a movement sensor 14 may be processed using a function that does not apply any threshold, so any input 12 triggers the function and the output creates values over a wide area in the grid 18. In contrast an input 12 from a heat sensor 14 may be processed using a function that requires a temperature above a set level (15 degrees centigrade for example) for a defined time period (longer than 5 seconds) before generating values in the grid 18 with a relatively smaller area of the grid 18 being affected.

Figure 5:
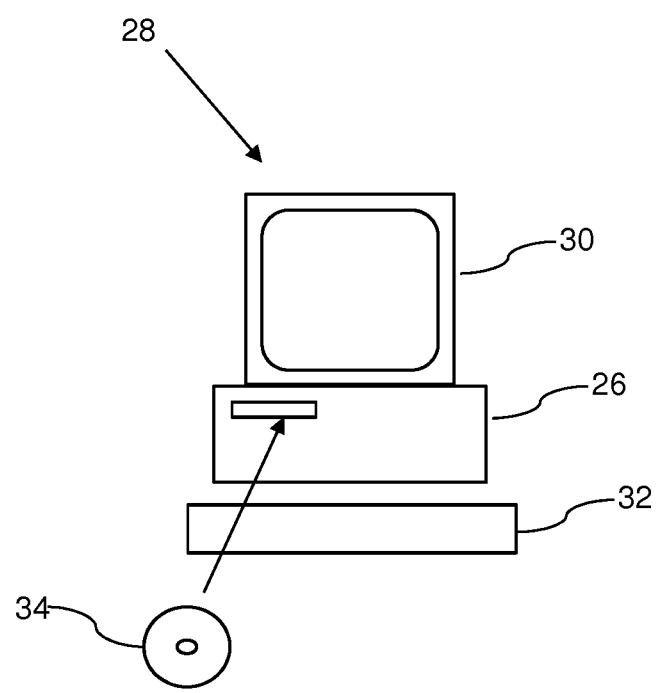
FIG. 5 is a schematic diagram of a computer system.

FIG. 5 illustrates a computer system 28 that is used to create and maintain the grid(s) 18. The system 28 includes the processor 26 and also comprises a display device 30 and a user interface device (a keyboard) 32. A computer readable medium 34 is also provided which here is a CD-ROM 34.

The computer readable medium 34 has located thereon a computer program product, which comprises instructions for controlling the operation of the processor 26. An administrator can view one or more grids 18 on the display device 30 and see the current status of sensor inputs 12 and device outputs 24 as well as perform other actions in relation to the operation of the processor 26 such as changing algorithm parameters for example.

In the simplest operation of the system 28, the processor 26 will be maintaining a single grid 18, into which all sensor inputs 12 will feed directly. If all the sensor devices 14 are the same then a single algorithm will be used to convert the sensor input(s) 12 into values within the grid 18. If there are multiple different types of sensor device 14 then the processor 26 will operate sensor type specific algorithms, all of which will feed into the same grid 18. This grid 18 is then used to control the output devices 10 (which may be lights) present within the space 100, for example using a video to light algorithm that takes the colours present in the grid 18 and uses those to control the lights 10.

In a more complex system 28, as discussed above, multiple different grids 18 are maintained by the processor 26, although only a single final grid 18 is used to control the output devices 10 with all the other grids 18 being intermediate grids 18 that feed into the final grid 18. Each individual intermediate grid 18 will be designated to a specific sensor type and will have a dedicated algorithm that will control the representation of the input values 12 in that specific grid 18. The intermediate grids 18 than feed into the final grid 18, which is the grid 18 from which the output devices 10 are controlled.

Figure 6:
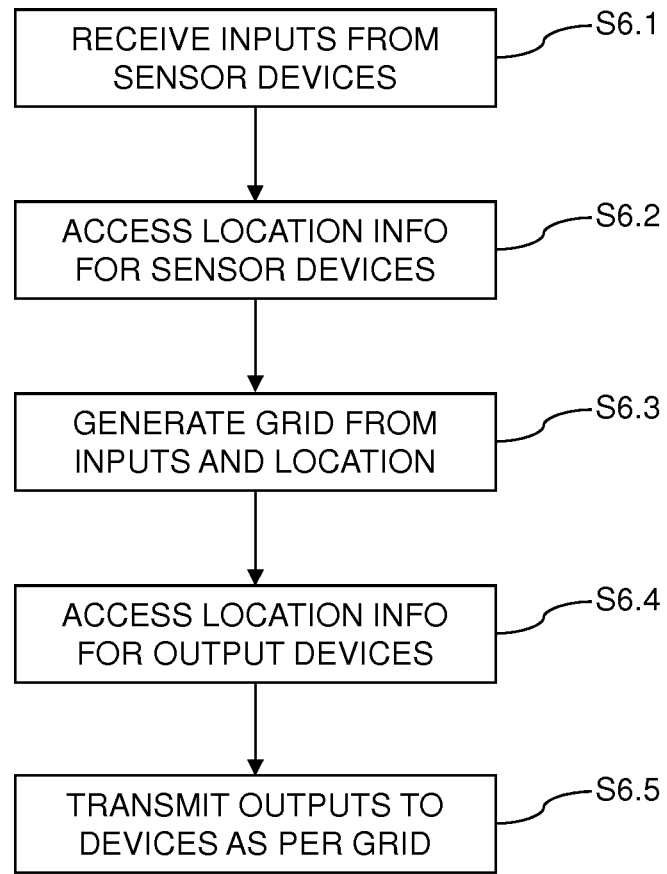
FIG. 6 is a flowchart of a method of controlling output devices.

FIG. 6 summarises the method of controlling the output devices 10.

The method comprises firstly step S6.1, which comprises receiving inputs 12 from sensor devices 14 (which may be one type of sensors 14 or many different types) and secondly step S6.2 which comprises accessing location information 16 defining the location of each sensor device 14. The processor 26 receives the inputs 12 and has access to the stored information about the location of the sensors 14.

The next step of the method is step S6.3, which comprises generating a grid 18 from the received inputs 12 and the accessed location information 16, the grid 18 containing non-zero values 20 at the locations of the sensor devices 14 for which an input 12 has been received and containing non-zero values 20 at locations related to the locations of the sensor devices 14 for which an input 12 has been received. The grid 18 represents the inputs 12 from the sensor devices 14 according to one or more algorithms which populate the grid 18 with values in dependence on the received inputs 12. As discussed above, intermediate grids 18 may be created before the creation of a final grid 18.

The next step of the method is step S6.4, which comprises accessing location information 22 defining the location of each output device 10, and the final step of the method is step S6.5, which comprises transmitting outputs 24 to those output devices 10 (which may be one type of output device 10 or many different types) whose value at the location of the respective output device 10 within the grid 18 is above a predetermined threshold (which could be zero). The processor 26 uses the values in the grid 18 to drive the operation of the output devices 10. Where values in the grid 18 are above a certain threshold and an output device 10 is located at such a point in the grid 18, then an output from that device 10 will be generated.

The process shown in FIG. 6 can be extended by additional steps, depending upon the implementation of the actual system. For example, if multiple different types of sensor devices 14 and/or output devices 10 are being used in the system, then the processor 26 will need to access information about the specific types of sensor devices 14 and/or output devices 10 and may also need to access different functions that are used to process the inputs received from different types of sensor devices 14.

The configuration of the sensors 14 within a space 100 can be set as desired. For example, rather than installing a small number of specific movement sensors (such as passive infrared sensors) the space being covered by the grid 18 can be covered by installing a large array of presence sensors, pre-built as one on each light in a ceiling grid, with each one having small beam angle to detect just the area under the light. This can create a more granular view of the space 100, including the ability to detect movement, number of occupants and where they are in the space 100. If only one person is in the space 100, then lighting may become more focussed to the single area of the space 100. This behaviour can still however be adapted by choosing different output algorithms that use the sensor data gathered in different ways.

Hotspots of desired illumination can be shown on the heat map 18, triggered by the sensor feedback. The heat map 18 might have a hysteresis that also captures the movement, transition and persistence of lighting (or not) as people move around and congregate in different areas, or spread out. Depending on the current status of inputs from the space 100, the algorithm of the heat map 18 might make the values within the grid 18 stronger where presence is detected but movement is low, indicating a more concentrated working state. Or conversely the grid 18 may create a greater intensity where people are moving, which would be suitable for a corridor or for a speaker and audience, where the presenter is likely to be the more animated and require the higher lighting.

The grid 18 can also be used for daylight management. A heat map image of the detected ambient light level in a space 100 can be built up from a number of luminance (LUX) level sensors 14 around the space 100. The levels between sensors 14 and in extremities of the room can be estimated from the detected value to produce a complete map. This view can be compared with a target pattern, which might be a certain luminance across the whole space 100 or a pattern of different brightness that is desired as part of a lighting output or other heat map input.

Where the heat map 18 shows the lighting to be higher than planned, the correspondingly located lights 10 can be dimmed and those where the light level is below target can be turned up. As the adjusted lighting will contribute to the detected light going forward this will create a dynamic feedback loop which if damped will settle to a stable state close to the desired result while external lighting cues are static, if either the desired state or the ambient effects change, for example a variation in sunlight through a window, then the system will attempt to reach a new stable state. This is a form of closed loop-control.

The use of the grid 18 embodied as a heat map 18 has a number of advantages. The approach takes advantage of techniques for image processing that are well understood, in industries such as gaming and security there are many algorithms for the efficient processing of visual data and patterns. Because the sensing and lighting arrays are typically deployed in grid formations, and to a large degree these can be related directly to the mapping it has a strong logical correlation to deployment. Large amounts of real-time data can be quickly captured in a format appropriate to the control domain.

The invention claimed is:

1. A method of controlling output devices, the method comprising:

receiving inputs from sensor devices, identifying, for each sensor device, a specific type of the sensor device and a different specific function for accessing the respective specific type of sensor device, accessing location information defining a location of each sensor device, generating a final grid from the received inputs and the accessed location information, the final grid containing non-zero values at the locations of the sensor devices for which an input has been received and containing non-zero values at locations related to the locations of the sensor devices for which an input has been received, wherein generating of the final grid comprises generating a plurality of intermediate grids, each intermediate grid representing inputs from a different specific type of sensor device and where each input received from a sensor device is processed with the different specific function for accessing the respective specific type of sensor device, and generating the final grid from the plurality of intermediate grids, accessing location information defining a location of each output device; and transmitting outputs to those output devices whose value at the location of the respective output device within the grid is above a predetermined threshold.

2. The method according to claim 1, wherein the step of generating the grid comprises executing an algorithm that generates first values at the locations of the sensor devices for which an input has been received and generates second values lower than the first values at locations surrounding the locations of the sensor devices for which an input has been received.

3. The method according to claim 1 and further comprising applying a time decay function to the values of the grid, the time decay function lowering the non-zero values of the grid by a defined amount per predefined time period.

4. The method according to claim 1 and further comprising receiving new location information for a sensor device or an output device and updating the location information defining the location of each sensor device or the location information defining the location of each output device respectively.

5. A system for controlling output devices, the system comprising a processor arranged to:

receive inputs from sensor devices, identify, for each sensor device, a specific type of the sensor device and a different specific function for accessing the respective specific type of sensor device, access location information defining a location of each sensor device, generate a final grid from the received inputs and the accessed location information, the final grid containing nonzero values at the locations of the sensor devices for which an input has been received and containing non-zero values at locations related to the locations of the sensor devices for which an input has been received, the final grid generated from a plurality of intermediate grids, each intermediate grid representing inputs from a different specific type of sensor device and where each input received from a sensor device is processed with the different specific function for the respective specific type of sensor device, access location information defining a location of each output device, and transmit outputs to those output devices whose value at the location of the respective output device within the grid is above a predetermined threshold.

6. The system according to claim 5, wherein the processor is arranged, when generating the grid, to execute an algorithm that generates first values at the locations of the sensor devices for which an input has been received and generates second values lower than the first values at locations surrounding the locations of the sensor devices for which an input has been received.

7. The system according to claim 5 wherein the processor is further arranged to apply a time decay function to the values of the grid, the time decay function lowering the non-zero values of the grid by a defined amount per predefined time period.

8. The system according to claim 5 wherein the processor is further arranged to receive new location information for a sensor device or an output device and update the location information defining the location of each sensor device or the location information defining the location of each output device respectively.

* * * * *